No. 799,976. PATENTED SEPT. 19, 1905.
A. DEBATTISTA.
AMUSEMENT DEVICE.
APPLICATION FILED JULY 22, 1905.
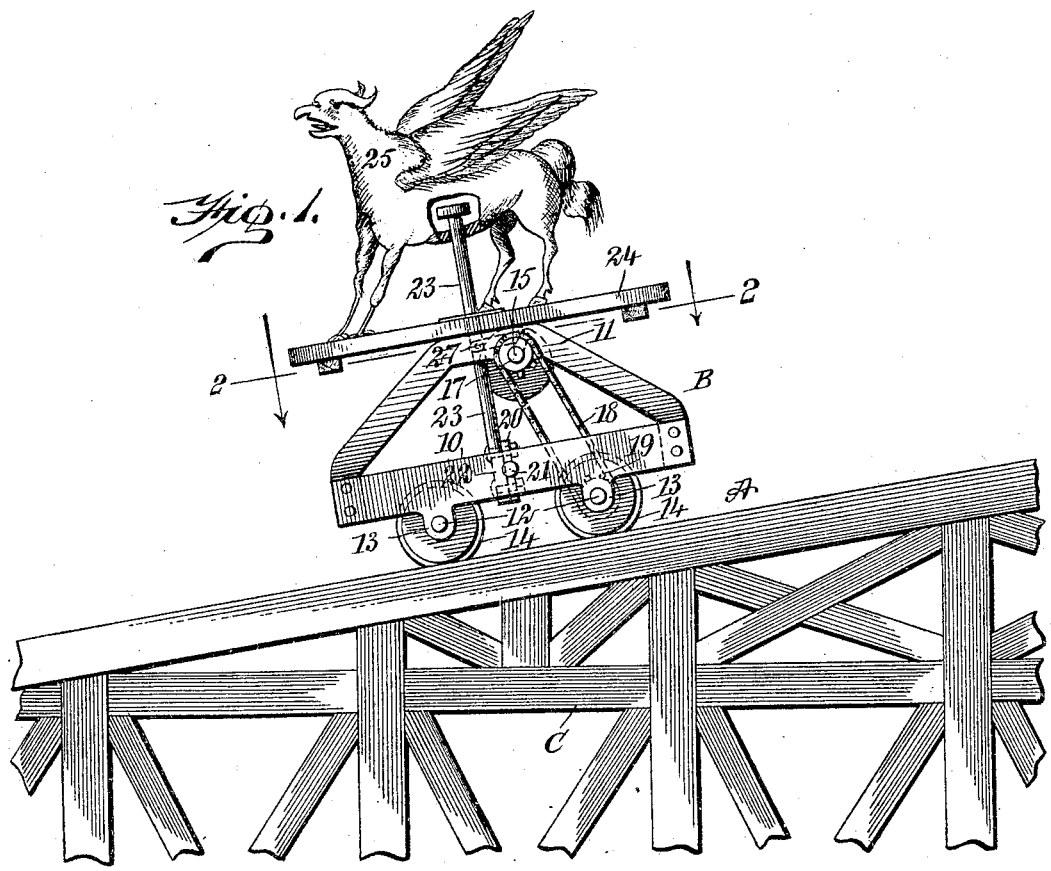
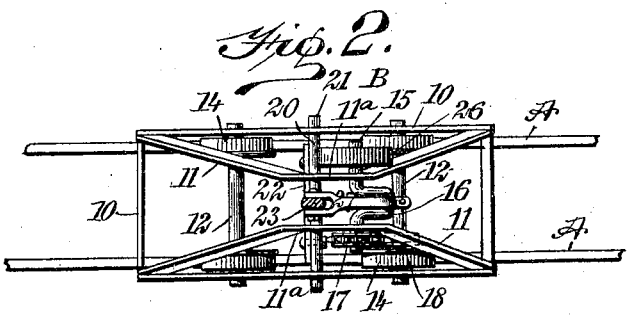
WITNESSES:
INVENTOR
Auguste Debattista
BY
ATTORNEYS

UNITED STATES PATENT OFFICE.

AUGUSTE DEBATTISTA, OF NEW YORK, N. Y.

AMUSEMENT DEVICE.

No. 799,976.　　　Specification of Letters Patent.　　　Patented Sept. 19, 1905.

Application filed July 22, 1905. Serial No. 270,802.

*To all whom it may concern:*

Be it known that I, AUGUSTE DEBATTISTA, a citizen of the United States, and a resident of the city of New York, Coney Island, borough of Brooklyn, in the county of Kings and State of New York, have invented a new and Improved Amusement Device, of which the following is a full, clear, and exact description.

The purpose of the invention is to provide an amusement device especially adapted for out-of-door use, wherein inclined, straight, or undulating tracks are employed, and cars are mounted to travel by gravity on said tracks, each car being provided with a platform and an object thereon, grotesque, illustrative, or plain and adapted to serve as a seat for one or more individuals, and, further, to provide means whereby through the motion of the car an up-and-down and a forward-and-rearward motion is imparted to the platform and object carried thereby.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in both the figures.

Figure 1 is a side elevation of a portion of the track and the improved car upon the track; and Fig. 2 is a horizontal section through the car, the section being taken practically on the line 2 2 of Fig. 1.

A represents the rails of a track, and B the car which is to travel upon said rails.

C represents a trestle-support for the rails.

The tracks may be laid inclined, as shown, or they may be undulating or straight, or inclined for parts of their length and straight or curved at other portions.

In the construction of the car B a rectangular skeleton base 10 is employed, as best shown in Fig. 2, together with skeleton side sections 11, secured to the said base. The top portions 11$^a$ of the side sections 11 are straight and horizontal, while the sides are inclined, and the said side sections 11 are furthermore curved or inclined inwardly, so as to render the space between the upper portions of the side sections much less than the space between the sides and the base 10. The base is provided with axles 12, usually two in number, journaled in pedestals 13, as is shown in Fig. 1, and wheels 14 are secured upon the said axles, the said wheels being of such character that they will readily travel on the rails A without slipping therefrom, and to that end the said wheels are ordinarily flanged, as shown. A shaft 15 is journaled in the upper portion of the side sections 11 at one side of the center of said sections, as is shown in Fig. 1, and the said shaft extends out beyond the side sections, and between said side sections the shaft is provided with a crank-arm 16. (Shown in Fig. 2.) A sprocket-wheel 17 is secured to one end of the crank-shaft 15, connected by a chain 18 with a sprocket-wheel 19 on one of the axles 12, so that as the car travels over the track upon which it is placed motion is communicated to the crank-shaft 15. A plate 20 is located between the sides of the base of the car at its center, and the said plate 20 is provided with trunnions 21, extending through the said sides of the car, so that the plate has rocking movement in the car. The widened lower end 22 of a rod 23 is bolted or otherwise secured to the said plate 20. This rod 23 passes up through a platform 24, which rests upon the upper edges 11$^a$ of the side sections of the car, but is not attached to the car, and upon the said platform an object 25 is mounted, adapted to constitute a seat, and the said upwardly-extending bar 23 enters the said object in such manner that the object as well as the platform can have movement relative to the bar.

A connecting-rod 27 is pivoted to the upwardly-extending bar 23 and to the crank-arm 16 of the shaft 15, so that as the shaft 15 is turned a pivotal reciprocating movement is imparted to the said bar 23, which communicates said movement to both the platform and the object thereon. An up-and-down movement of the platform and object is likewise obtained by securing a cam 26 on the end of the crank-shaft 15 opposite that carrying the sprocket-wheel 17, and the rising portion of this cam as it revolves engages with the bottom of the platform 24 at or about its center to lift the same and gradually drop it as the reduced portion of the cam comes uppermost.

It is obvious that when a car constructed as described is placed upon an inclined track it will run down the track by gravity, and as the car receives motion the connections between the axle of the car, the crank-shaft, and the pivoted bar 23 serve to automatically impart a forward-and-rearward and an up-and-down movement to the platform and the object thereon.

Having thus described my invention, I claim as new and desire to secure by Letters Patent—

1. In an amusement device, a car, a platform and an object carried thereby loosely sustained on the car, and means carried by the car and operated by the motion of the car to impart motion to the platform and object thereon.

2. In amusement devices, a car comprising a frame, axles carried thereby and wheels carried by the axle, the said body having upwardly-extending sides flat at the top and inclined at the front and rear edges, the said sides of the car being narrower at the top than at the bottom, a crank-shaft journaled in the upper portion of the sides, a cam at one end of the crank-shaft and a sprocket-wheel at the other, a sprocket-wheel on the axle, a chain connection between the axle-sprocket and the sprocket of the crank-shaft, an upwardly-extending bar pivoted to the base portion of the body and extending above the upper portion of its sides, a pitman connection between the said bar and the crank-arm of the crank-shaft, a platform loosely mounted on the flat upper portion of the car, an object carried by the platform, the said object and the said platform being loosely connected with the said upwardly-extending pivotal bar, whereby the platform and the object have an up-and-down and a forward-and-rearward movement, the said cam being immediately below the said platform.

3. In amusement devices, a car, an axle whereof is provided with a driving-sprocket, a crank-shaft journaled in the upper portion of the car, also provided with a sprocket, a chain connection between the sprocket of the shaft and the sprocket of the axle, a cam carried by the crank-shaft, a bar pivoted at its lower end in the body of the car, a platform loosely passed over the said bar, resting on the upper portion of the car, being in the path of the rising portion of the cam, and an object located on the platform, through which the upper portion of the bar is loosely passed.

In testimony whereof I have signed my name to this specification in the presence of two subscribing witnesses.

AUGUSTE DEBATTISTA.

Witnesses:
 JEAN BAPTISTE MARTINO,
 GRAHAM H. CHAPIN.